United States Patent [19]

Monk

[11] 4,432,690

[45] Feb. 21, 1984

[54] STRADDLE CARRIER

[76] Inventor: John T. Monk, 405 Meadow Moss Dr., Jackson, Miss. 39206

[21] Appl. No.: 203,328

[22] Filed: Nov. 3, 1980

Related U.S. Application Data

[63] Continuation of Ser. No. 912,991, Jun. 6, 1978, abandoned.

[51] Int. Cl.³ ............................................. B60P 3/00

[52] U.S. Cl. .................................. 414/460; 267/64.15

[58] Field of Search ............. 414/459, 460; 267/64 R, 267/64.15; 180/23; 91/6

[56] References Cited

U.S. PATENT DOCUMENTS

| | | | |
|---|---|---|---|
| 2,248,865 | 7/1941 | Griepenstook | 267/64.15 |
| 2,620,182 | 12/1952 | Marston et al. | 280/DIG. 1 |
| 3,171,643 | 3/1965 | Roos | 267/64.15 |
| 3,655,081 | 4/1972 | Monk | 414/460 |
| 3,703,243 | 11/1972 | Monk | 414/460 |
| 3,828,954 | 8/1974 | van der Lely et al. | 414/460 |
| 3,860,225 | 1/1975 | Nakomura | 267/64.15 |
| 3,933,215 | 1/1976 | Scheuerle | 180/23 |
| 4,119,230 | 10/1978 | Keller et al. | 414/460 |

*Primary Examiner*—Lawrence J. Oresky
*Attorney, Agent, or Firm*—Sixbey, Friedman & Leedom

[57] ABSTRACT

A straddle carrier which may be driven over either end of a load to be lifted, the carrier having a chassis including spaced parallel elongated frame members which are connected together adjacent their ends by vertically disposed structural arches to form a rigid rectangular frame enclosing an unobstructed load bay. At least two pairs of wheels are disposed on each side of the chassis and a compressed air over oil suspension system is provided for attaching each wheel to the chassis. The compressed air over oil suspension system provides for decreasing the air space in the system to thereby enhance the stability of the carrier. A rectangular load lifting structure is disposed between the frame members and provides for guiding the load lifting structure during ascent and descent are provided to facilitate positioning of the load lifting structure from side to side between the frame members of the chassis. The load lifting structure is raised and lowered by hydraulic cylinders, the uneven extension of which is sensed. It is also possible to tilt one end of the load lifting structure with respect to the other.

29 Claims, 9 Drawing Figures

FIG. I
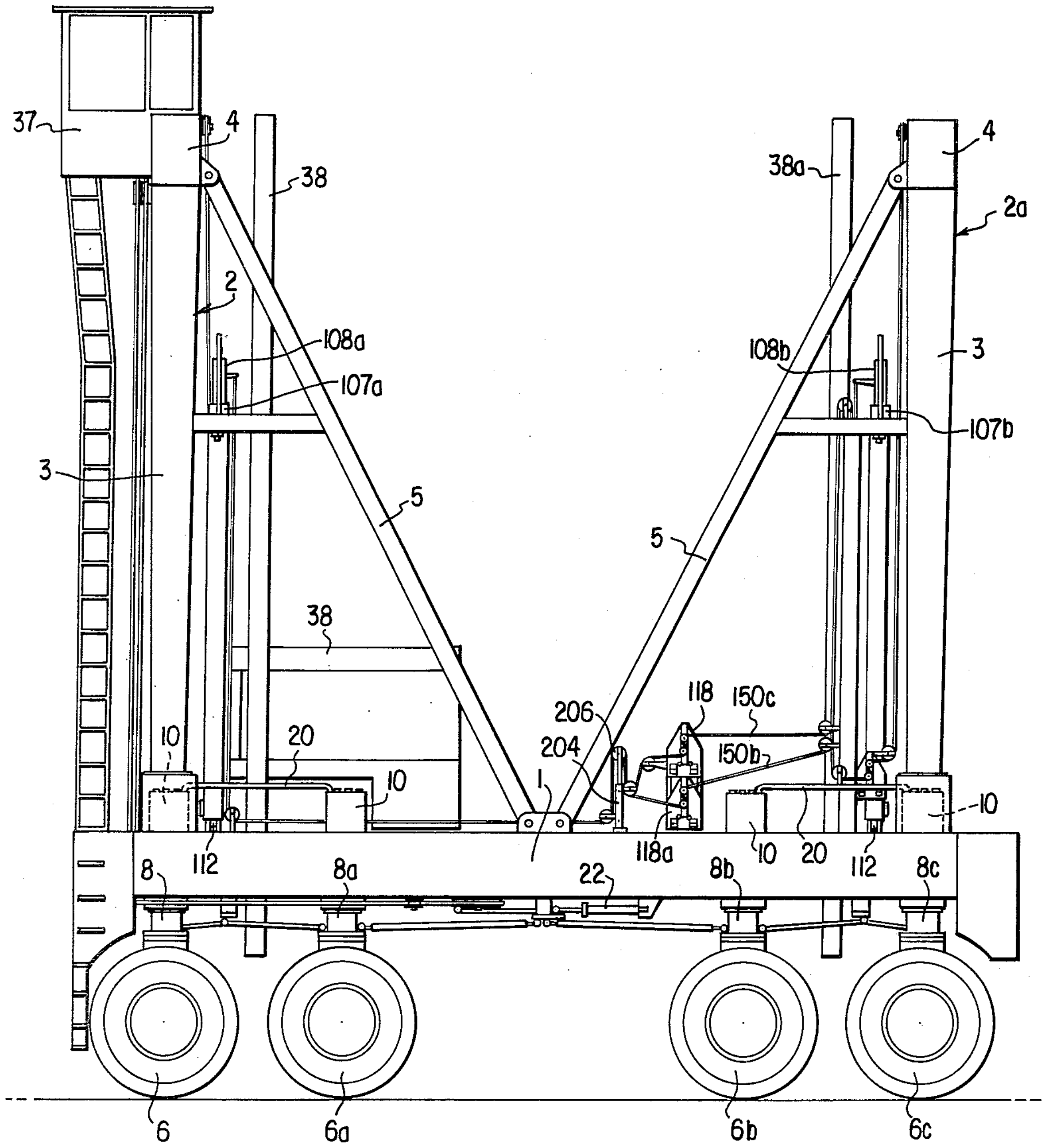

STRADDLE CARRIER

This application is a continuation of application Ser. No. 912,991, filed June 6, 1978, now abandoned.

BACKGROUND OF THE INVENTION

1. Field of the Invention

This invention relates to self-propelled straddle carrier type material handling vehicles so designed that the load to be carried is suspended within the framework of the vehicle, the vehicle may be of such size and proportions as to permit engaging, hoisting, stacking, and transporting van size containers by driving the vehicle over them from either direction.

2. Discussion of the Prior Art

Prior art machines of the above type are subject to heavy wheel loadings, uneven weight distribution among the supporting wheels and poorly coordinated steering, which results in excessive tire maintenance and damage to the surfaces upon which they operate. Further, their exposed bearings and linkage wear rapidly requiring frequent lubrication and replacement.

A straddle crane, which has been reduced in width, is disclosed in U.S. Pat. No. 3,804,189, the crane having four wheels on each side where the inner wheels are sprung and the outer wheels are unsprung, the sprung wheels being suspended by rubber enclosed compressed air suspension units. In a straddle crane, the arches are the dominant feature and are connected by flexible side frame members. There are no springs and the frames flex with the contour of the supporting surface. This means the load bay is distorted which in turn brings on numerous other complications. The frame of a straddle carrier such as that of the present invention is as rigid as practical and the machine is supported by some form of flexible suspension system. The machines do not flex to follow the contours of the supporting surface. Other prior art straddle carrier patents are my U.S. Pat. Nos. 3,655,081 and 3,703,243, both of which are hereby incorporated herein by reference.

SUMMARY OF THE INVENTION

A principal objective of my invention is to provide a straddle carrier with moderate wheel loadings evenly distributed among the supporting wheels and positive coordinated steering which would substantially eliminate exposed wear points and linkage.

The main frame of the straddle carrier of this invention typically comprises spaced parallel elongated frame members which are connected together adjacent their ends by means of braced, vertically disposed structural arches to form a rigid rectangular frame enclosing an unobstructed load bay. One of the arches may carry adjacent its upper end the cab for the driver in which is disposed the steering wheel and various controls for the vehicle.

Four tandem arranged supporting wheels are flexibly applied to the undersides of each of the frame members in such manner that each of a pair supports equal weight. One or more of the wheels on each side is driven by a motor. All wheels are preferably steerable and are preferably connected so as to be simultaneously actuated in such a manner that projections of the axles of all wheels, both those of the inner and outer frame members, will substantially intersect at some common point regardless of the radius of the curvature.

A futher object of my invention is to provide a simple trouble-free drive mechanism. This is preferably accomplished by mounting an engine on one side frame to drive a hydraulic pump which supplies fluid under pressure to direct drive motors integral with one or more wheels on each side frame.

It is a further object of my invention to provide in a straddle carrier of the above type an air over oil suspension system for attaching each wheel to the chassis, and for interconnecting the suspension system in such a manner as to substantially equalize the load shared by all wheels.

It is a further object of my invention to provide in a straddle carrier of the above type means for decreasing the air space in the suspension means to thereby enhance the stability of the carrier.

It is a further object of my invention to provide in a straddle carrier of the above type a steering means for simultaneously actuating all the wheels so that wheels disposed at opposite ends of the chassis turn through opposite angularity and the projections of the axes of rotation of all the wheels intersect at a common point for all radii of curvature of steering.

It is a further object of my invention to provide in a straddle carrier of the above type a rectangular load lifting means disposed between the frame members and improved means for positioning the load lifting means from side to side between the frame members of the chassis and/or fore and aft with respect to the chassis.

It is a further object of my invention to provide in a straddle carrier of the above type power means for raising and lowering the load lifting means and for also propelling the carrier, said power means including an improved fluid circuit for raising and lowering the load lifting means whereby the size of the power means may be reduced.

It is a further object of my invention to provide in a straddle carrier of the above type improved means for levelling the load lifting means during ascent and descent thereof.

It is a further object of my invention to provide in a straddle carrier of the above type means for tilting one end of the load lifting means with respect to the other end.

Other objects and advantages of this invention will be apparent from a reading of the following specification and claims taken with the drawing.

BRIEF DESCRIPTION OF THE DRAWING

FIG. 1 is a side elevation of an illustrative straddle carrier in accordance with the invention.

FIGS. *2a–2c* are sectional views illustrating various positions of an illustrative suspension unit for the wheels of the carrier of FIG. 1.

Figure 3:
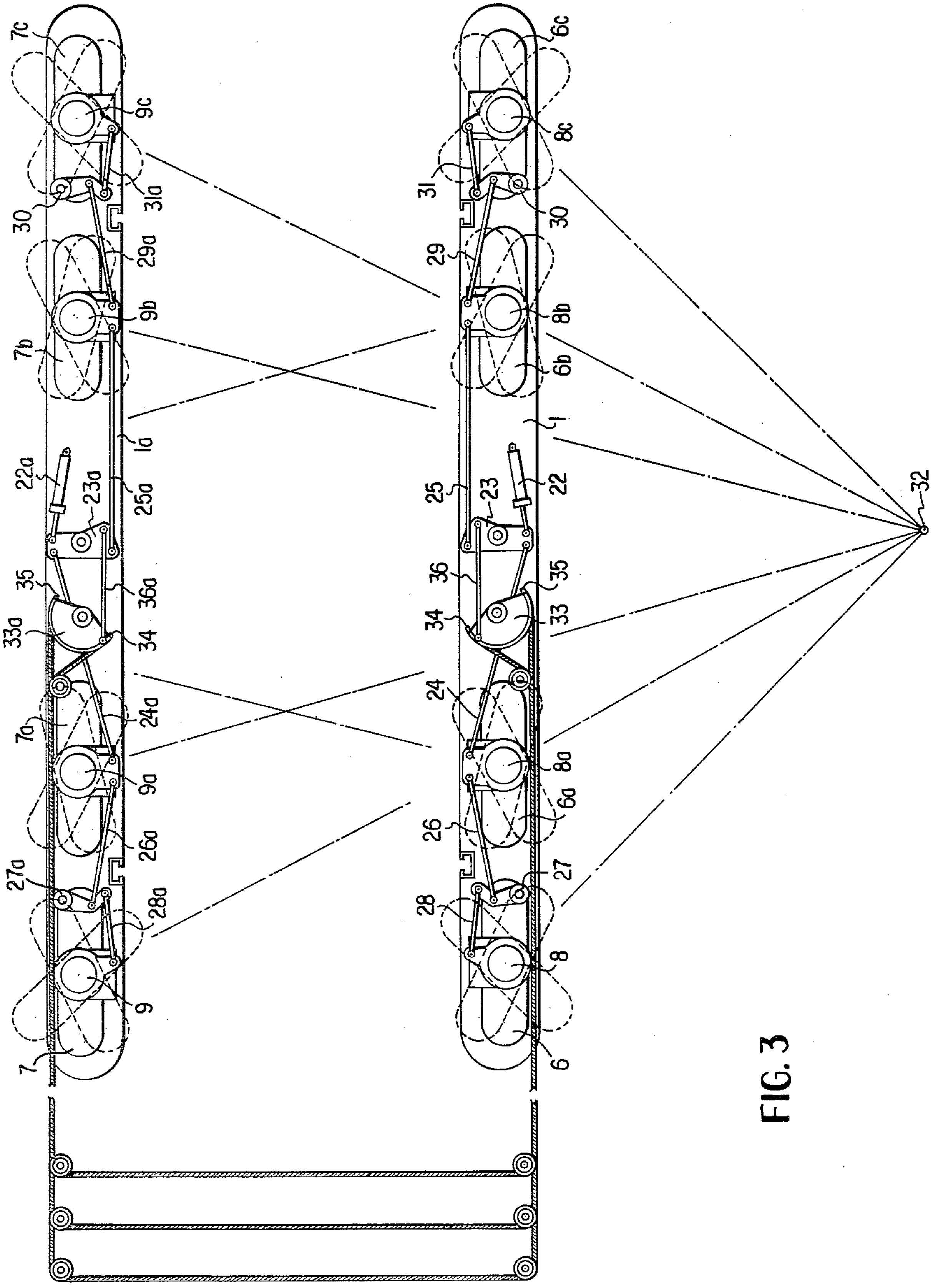

FIG. 3 is a plan view of an illustrative steering mechanism for the wheels of the carrier of FIG. 1.

Figure 4:
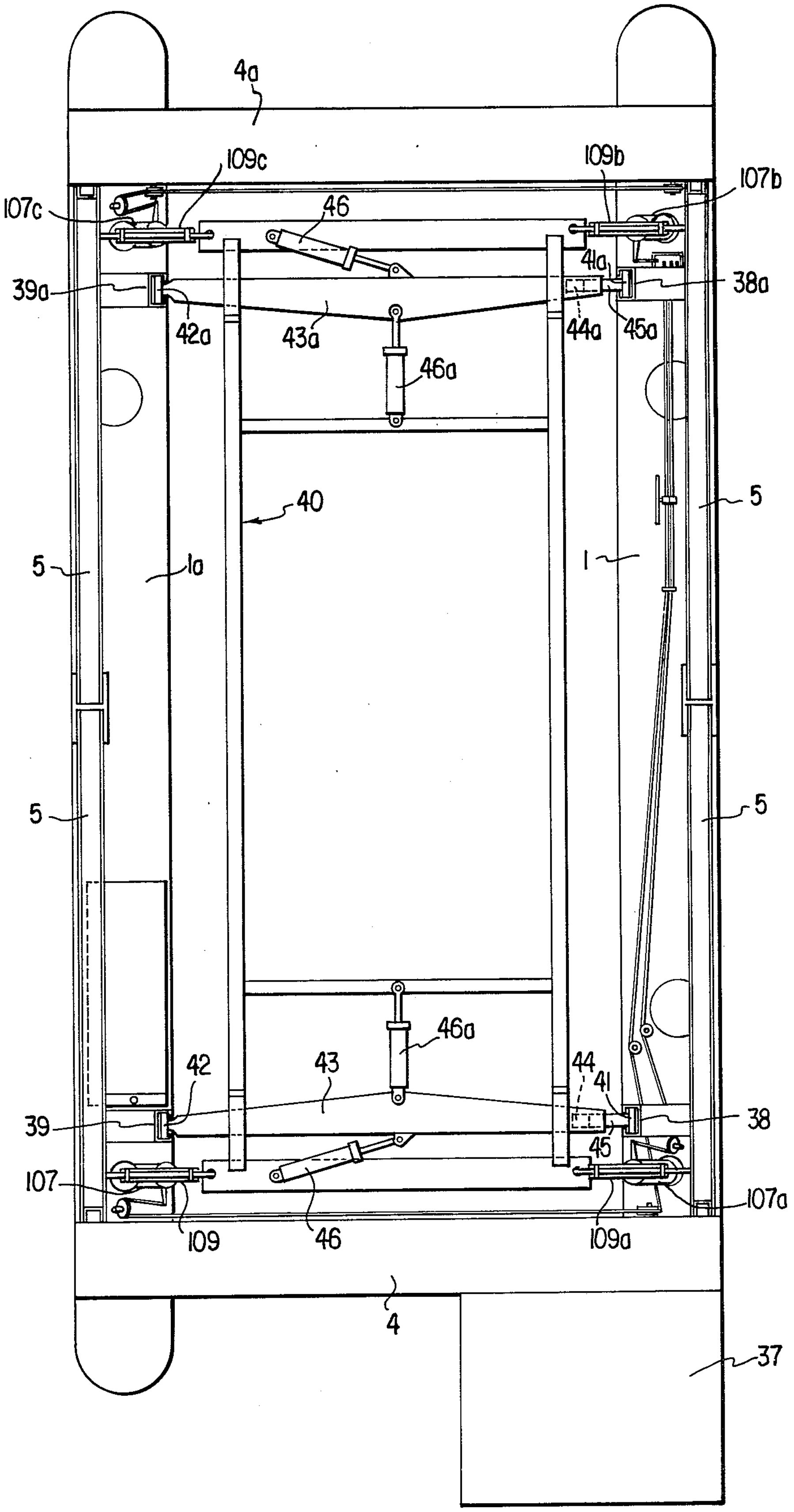

FIG. 4 is a top plan view of the carrier of FIG. 1.

Figure 5:
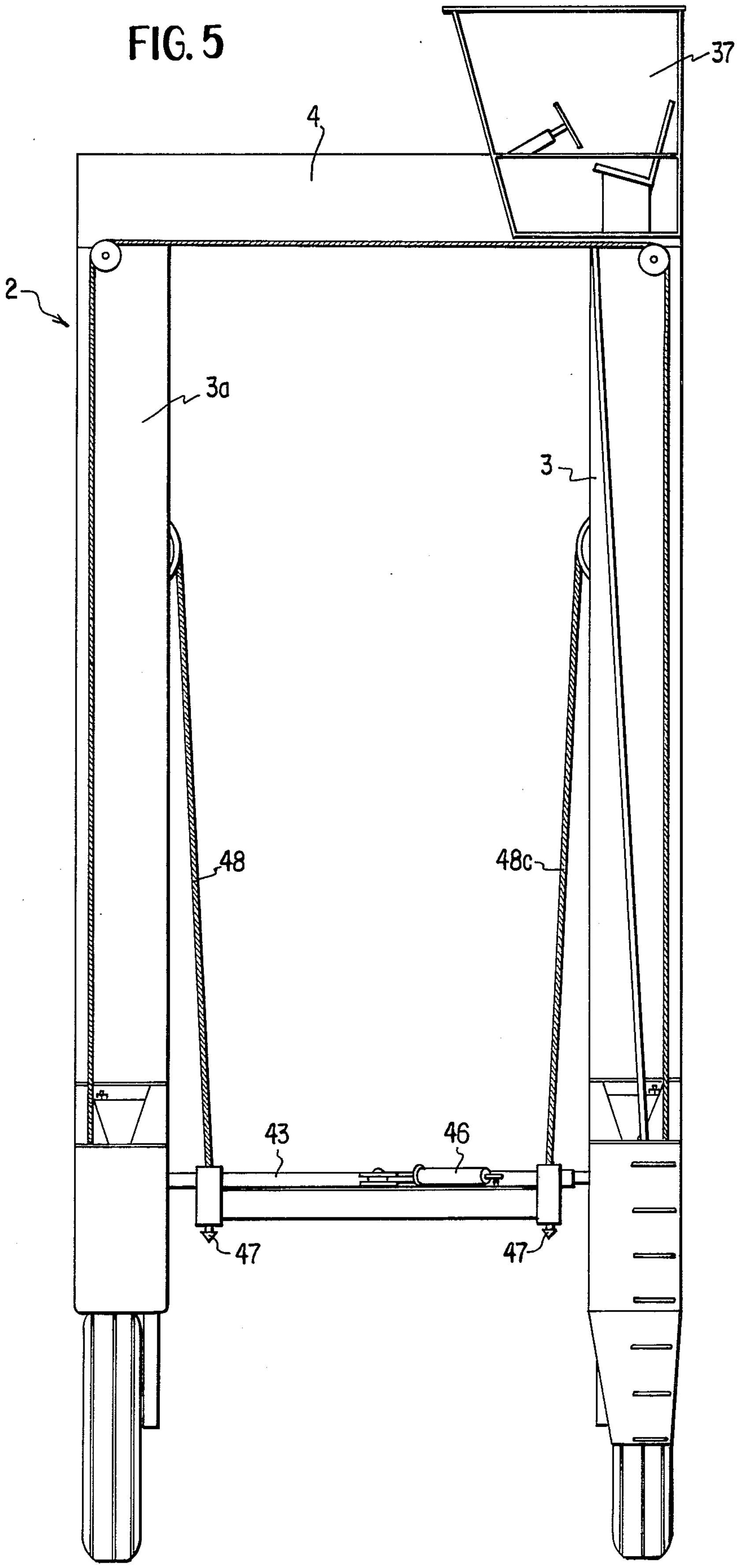

FIG. 5 is an end elevation view of the carrier of FIG. 1.

Figure 6:
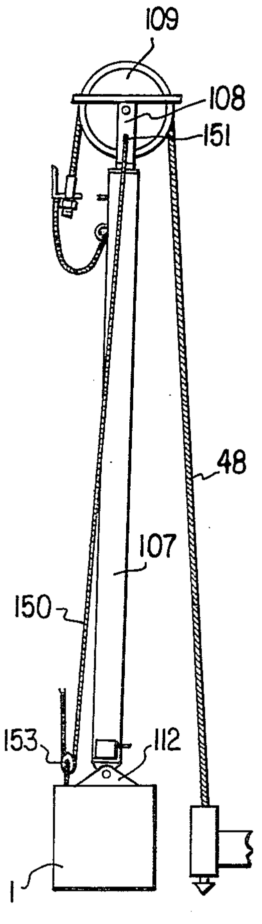

FIG. 6 is an end elevation of an illustrative hoisting cylinder and ram in accordance with the invention.

Figure 7:
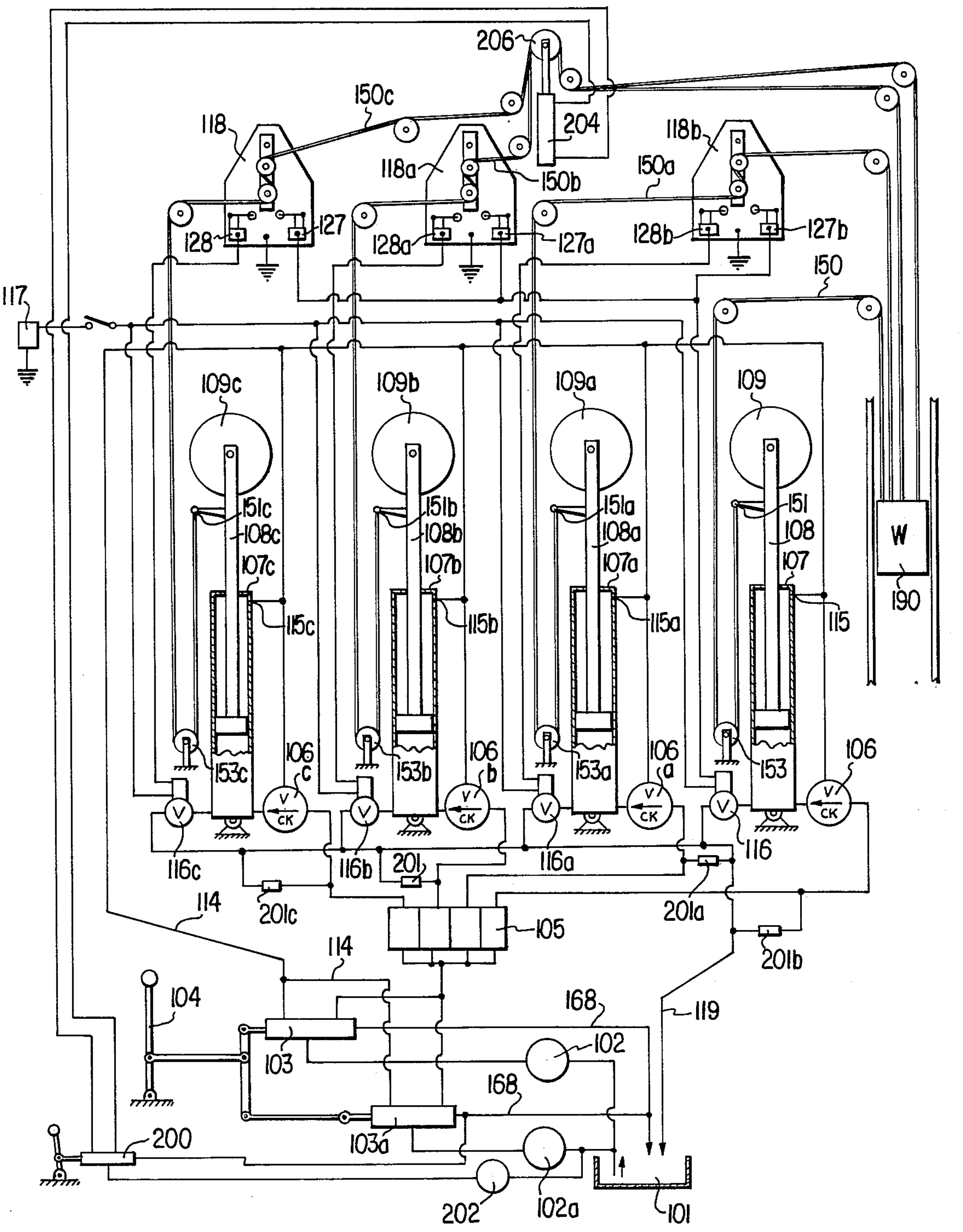

FIG. 7 is a schematic diagram of illustrative beam lift, leveling and tilting circuitry in accordance with the invention.

DETAILED DESCRIPTION OF PREFERRED EMBODIMENT

Reference should be made to the drawing where like reference numerals refer to like parts.

MAIN FRAME

The main frame generally corresponds to that disclosed in my aforementioned U.S. Pat. No. 3,655,081. In particular, the main frame of the vehicle of the present invention comprises, as shown in FIGS. 1, 3 and 4, two spaced parallel elongated horizontal members 1 and 1*a* preferably formed of structural plates or tubing connected to one another adjacent each end thereof by inverted U-shaped arches 2 and 2*a* preferably formed of structural plates and angle bars, both arches 2 and 2*a* being of substantially the same construction and serving to keep the main frame members 1 and 1*a* in proper spaced relation with one another and to provide clearance for the frame to straddle a load by driving either end of the vehicle over the load to be lifted. The arches 2 and 2*a* each comprise pairs of vertical legs 3 and 3*a* resting upon and secured to the respective frame members 1 and 1*a*, the upper ends of the vertical legs of each pair being connected together by horizontal beams 4 and 4*a* formed of structural plates and angle bars. The arches 2 and 2*a* are in turn stiffened by diagonal braces 5 disposed over the main frames 1 and 1*a* extending from the upper ends of the vertical legs 3 to approximately the mid points of the main frames 1 and 1*a*.

SUSPENSION SYSTEM

The vehicle frame is supported in a manner which generally corresponds to the support system described in my U.S. Pat. No. 3,655,081; however, the support system of the present invention is particularly adapted to carriers having at least eight wheels for carrying heavier loads where the load is substantially equally shared by all wheels and where a high measure of stability is achieved.

As indicated in FIGS. 1 and 3, main frames 1 and 1*a* are preferably each supported by four wheels 6, 6*a*, 6*b*, 6*c* and 7, 7*a*, 7*b*, 7*c* respectively which are mounted on trunnions 8, 8*a*, 8*b*, 8*c* and 9, 9*a*, 9*b*, 9*c* extending into frames 1 and 1*a* respectively. The trunnions of all wheels are preferably free to move vertically against flexible support and are rotatable about their vertical axis.

Figure 2C:
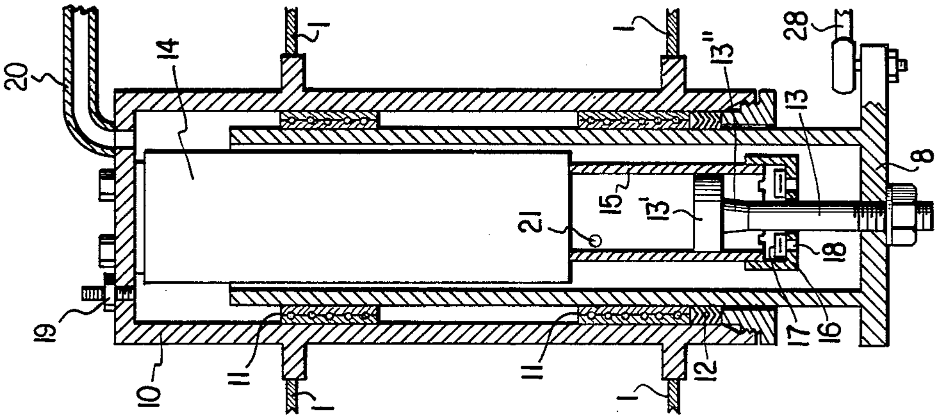
Figure 2B:
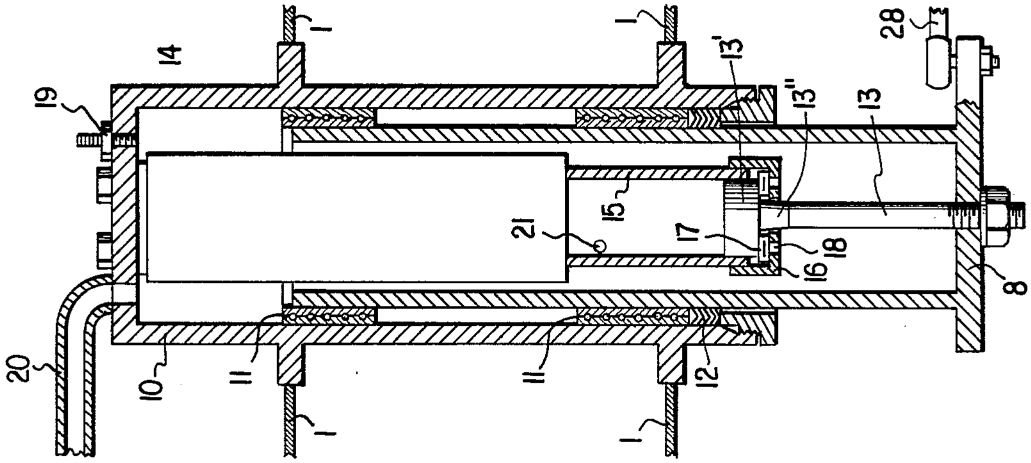

Each trunnion is preferably supported inside a housing 10 by bearings 11, as shown in FIG. 2. The lower end of housing 10 is closed by packing 12 to prevent the escape of oil or gas. The fixed cylindrical member 14 attached to the closed end of housing 10 and extending downward into trunnion 8 has a tubular member 15 attached thereto. The wall of tube 15 has holes 21 near the point of attachment to cylinder 14. Tubular member 15 is closed on its lower end by cylinder cap 16 which is fitted over the outside of tubular member 15 in such a manner as to leave a space between the end of tube 15 and the flat inner face of cap 16. A flat washer type check valve 17 larger than the interior bore of tube 15 but smaller than the exterior diameter of tube 15 is installed between the end of tube 15 and cap 16 in such a manner that it may move freely vertically within its place of confinement but cannot roll over or escape therefrom. The central bore in check valve 17 is substantially larger than the diameter of a piston rod 13 but not so large as to expose axially spaced holes 18 located in cap 16. Piston rod 13 is installed with the piston end confined within tube 15 and the rod end extending through a central opening in cap 16. The rod is secured to trunnion 8 by means of a shoulder on rod 13 and a retaining nut. It can be seen in FIG. 2*b* that trunnion 8 is prevented from over extension by piston rod 13 when the piston rests upon check valve 17 supported by cap 16.

Figure 2A:
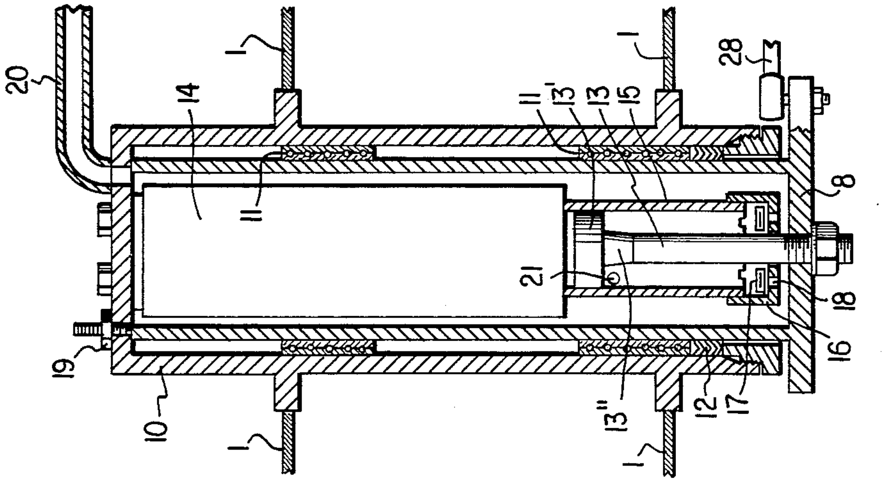

With the trunnion fully retracted as shown in FIG. 2*a*, the housing 10 is filled with a fluid such as oil through filler plug 19 which also incorporates an air check valve similar to that used on pneumatic tires. With plug 19 in place, a compressed gas such as air is introduced into the housing 10 through the check valve 19 causing trunnion 8 to extend, as shown in FIG. 2*c*, until frame 1 or 1*a* is supported with the desired amount of cushion. The compressed air within housings 10 thus serves as a spring to support the vehicle and as a thrust bearing for rotative movement of trunnion 8. Tube 20, as shown in FIGS. 1, 2*a*, 2*b* and 2*c*, connects adjacent housing 10 to equalize pressure within each pair and hence the weight applied to each wheel is equal so long as the limit of movement of the trunnion is not exceeded.

As trunnion 8 extends, fluid trapped between check valve 17 and piston 13' escapes between the piston 13' and tube 15 and between rod 13 and cylinder cap 16, the clearance between the respective parts controls the rate of flow and hence, the rapidity of extension. The piston rod 13 is tapered to a larger diameter 13" immediately adjacent the piston in order to further reduce the escape of fluid immediately prior to contact between the piston 13' and check valve 17 as can be seen in FIG. 2*b*. When trunnion 8 is forced inward as seen in FIG. 2*a*, fluid flows through the holes 18 in cap 16 and lifts check valve 17 to enter the void between piston 13' and cap 16. Fluid above piston 13' is forced out holes 21 in the upper end of tube 15 until the holes 21 are covered by movement of piston 13. Fluid displaced by further movement must escape through the clearance between piston 13' and tube 15 thus restricting movement of trunnion 8 immediately prior to contact of trunnion 8 with the closed end of housing 10.

The above described arrangement prevents violent stoppage at the extremities of travel of trunnion 8 and controls rebounding after the vehicle has run over an obstruction or high spot in the roadway. The tube 20 connecting the upper portions of adjacent housings 10 equalizes pressure within and insures equal weight distribution between the paired wheels as the vehicle travels over uneven surfaces. All bearings are sealed in oil and require no lubrication.

Further, in the above-described arrangement, the stiffness or resistance to impact loads may be controlled by increasing or decreasing the size of the non-compressible cylindrical member 14 and hence the air space in the unit and the rebounding or snubbing effect by the clearance between piston rod 13 and piston 13' and their associated parts.

STEERING SYSTEM

The steering system of the present invention generally corresponds to that disclosed in my U.S. Pat. No. 3,655,081 where the steering system of the present invention is uniquely adapted to a straddle carrier having at least eight wheels as described hereinbefore. In particular, pressure fluid may be supplied from a pump as shown in U.S. Pat. No. 3,655,081 mounted on a propulsion engine 38 to a steering wheel operated control valve in operator's cab 37. The control valve regulates flow of pressure fluid to steering cylinders 22 and 22a shown in FIGS. 1 and 3, which actuate bell cranks 23 and 23a in unison. Bell crank 23 is connected to trunnion 8a and 8b by links 24 and 25 respectively. Movement of bell crank 23 results in rotation of trunnion 8a and 8b in equal but opposite rotation of the trunnions. Trunnion 8a is connected by link 26 to bell crank 27 which in turn is connected by link 28 to trunnion 8. Trunnion 8b is connected by link 29 to bell crank 30 which in turn is connected by link 31 to trunnion 8c. Bell cranks 27 and 30 are proportioned so as to cause trunnion 8 and 8c to rotate a greater amount about their vertical axis than do trunnions 8a and 8b, the ratio being such that projections of the wheel axles on each respective side frame will substantially coincide at some common point 32 regardless of the radius of curvature. The linkage on side frame 1a is a mirror image of that on frame 1 and functions in a like manner.

In order to insure proper synchronization of the steering, quadrants 33 and 33a mounted on frames 1 and 1a respectively, the quadrants being connected by cables or other tensile members 34 and 35 so as to cause each to rotate a like amount in the same direction of rotation. Links 36 and 36a are connected to quadrants 33 and 33a and to bell cranks 23 and 23a respectively in such a manner as to achieve the greater steering angles required for those wheels on the inside frame of a turn than for those on the outside frame and thus insure that the projections of the axles of both frame 1 and 1a substantially coincide at a common point regardless of the rate of curvature.

LIFTING BEAM AND GUIDANCE SYSTEM

The lifting beam and guidance system of the present invention generally correspond to that disclosed in my U.S. Pat. No. 3,703,243 where the beam and guidance system has several improved features including a structure which readily permits positioning of the load within the carrier.

As can be seen in FIGS. 1 and 4, four vertical and parallel guide tracks 38, 38a and 39, 39a are attached to frames 1 and 1a and arches 2 and 2a to guide the vertical path of a lifting beam 40. These tracks are of closed construction as can be seen in FIG. 4 in order to prevent escape of the rollers 41, 41a and 42, 42a attached to cross beams 43 and 43a. The shaft on one end of each cross beam is fixed so that rollers 42 and 42a may be carried on bearings in such a way as to prevent the roller from coming off the end of the shafts. In particular, the rollers 42 and 42a must be able to resist side thrust in both directions as well as roll vertically in the guide tracks. The other ends of cross beams 43 and 43a have deep bushings 44, 44a to receive roller shafts 45, 45a which are integral with rollers 41, 41a in order to permit rotative as well as horizontal movement of the roller in rotation to the cross beams. This construction compensates for frame deflections which allows the vertical guide tracks to vary somewhat from parallel. Without the closed track, or a similar arrangement, the rollers may become disengaged from the tracks under some conditions.

The cross beams 43, 43a are carried within slotted openings near the opposite ends of lifting beam 40 and attached to each are two hydraulic cylinders 46, 46a. Cylinders 46a on each are connected to lifting beam 40 in a fore-and-aft direction. Cylinders 46a are connected to a single control valve (not shown) in the operator's cab and operate in concert. Since the vertical path of the cross beam is fixed by the tracks, the lifting beam will be shifted fore and aft by the extension or retraction of the fore and aft cylinders 46a. Each cross beam is also connected to the lifting beam with transverse hydraulic cylinders 46 which are connected to a separate control (also not shown) in the cab and the two may be operated simultaneously to shift the lifting beam from side to side within the machine frame or they may be operated independently to cause a rotative or slewing motion by the lifting beam. These controls permit precise control of the lifting beam within the frame.

The lifting beam is a rectangular framework which has a mechanism (part of which is shown at 47, 47a) for engaging a container in a known manner in each corner as described in U.S. Pat. No. 2,963,310 and a means for the operator to control its action. Lifting cables are attached near the corners for supporting the beam.

HYDRAULIC LIFT SYSTEM

The lift system is substantially the same as that described in my U.S. Pat. No. 3,703,243 with several differences which will be described below.

The operator is housed in the cab 37 mounted on the front face of cross beam 4 in such a manner as to give the best visibility possible. All controls for driving or hoisting are also located in cab 37. The engine 38 for hoisting and propulsion is mounted on frame member 1 near arch 2 as shown in FIG. 1. The engine 38 has several hydraulic pumps mounted upon it which furnish the power to operate various functions of the vehicle.

The frame of the vehicle also supports the lift mechanism and guidance system for the load to be lifted. The various systems and devices used to lift and control the load lifted will now be described in detail. In general it comprises four free hydraulic cylinders 107, 107a, 107b, 107c, FIGS. 1, 4 and 6, supported on the main frame members 1 and 1a by use of self aligning bearings 112 where the cylinders 107, 107a, 107b and 107c and their respective rams 108, 108a, 108b and 108c may be mounted as shown in FIG. 6.

The lift mechanism described herein is intended to lift or lower an object or adapter beam by use of double acting hydraulic cylinders and rams. Each ram has a sheave attached directly to its exposed upper end. The cylinders and rams do not stand vertical or parallel, but lean inwardly at their upper ends. All of the lift cylinders are identical in components and operation.

Hydraulic fluid is carried in tank 101, FIG. 7, pumped by engine driven pumps 102 and 102a to operator controlled valves 103 and 103a as will be described in more detail hereinafter. When valves 103 and 103a are in neutral or "hold" position, fluid circulates through the valves and back to tank 101. The other connections are closed. The valves are an open-center type designed to be used with double acting cylinders. When pressure from the pumps is applied to one outlet port the other communicates with the tank through line 168. When lever 104 is actuated to the "up" position, fluid from one or both of the pumps flows through the valves to the flow divider 105 where it is divided into four approximately equal parts, each being routed to the pilot operated check valves 106, 106a, 106b, 106c on the lower end of its respective cylinder 107, 107a, 107b, 107c thereby extending the related rams 108, 108a, 108b, 108c which carries sheave 109, 109a, 109b, 109c, upwardly, and raises the lifting beam 40 through the action of tensile members 48. The tensile members are attached to beam 40 each to one end thereof and to the frame structure of the machine at the other end adjacent the upper end of the corresponding cylinder. A pressure relief valve 201, 201*a*, 201*b*, 201*c* (FIG. 7) limits the maximum pressure which can be supplied to check valves 106, 106*a*, 106*b*, 106*c*, respectively by the flow divider 105. Excess pressure is dissipated through line 119 to tank 101.

The cylinders 107, 107*a*, 107*b*, 107*c* are attached to the frames 1 and 1*a* of the machine only at their bases, and each is supported on self-aligning bearing 112 in such a manner as to allow the movement of its upper end in all planes. The cylinders and rams are thus free to equalize the forces acting on lifting beam 40 and the anchors through the tensile members without being subjected to any bending loads.

When the operator moves the control 104 (FIG. 7) to the "Down" position, fluid flows through one or both of the valves 103 and 103*a* through line 114 to the cylinders at points 115, 115*a*, 115*b*, 115*c* respectively, and to the pilot pistons in valves 106, 106*a*, 106*b*, 106*c* causing same to open. Fluid may then escape from beneath the rams and through the valves and back to the tank by way of flow divider 105. Unless pressure is exerted on the pilot pistons in valves 106, 106*a*, 106*b*, 106*c* the valves will close and stop downward movement of the rams. If the downward movement of the rams requires more fluid than is supplied by the engine driven pumps 102 and 102*a*, the pressure will fall in line 114 and the pilot pistons in valves 106, 106*a*, 106*b*, 106*c* will close. Pressure applied at the upper side of the ram pistons at points 115, 115*a*, 115*b* 115*c*, forces the rams downwardly. If the load on the sheaves 109, 109*a*, 109*b*, 109*c* cause it to descend faster than fluid is supplied to points 115, 115*a*, 115*b*, 115*c*, the pressure in line 114 will become too low to hold the pilot check valves open in valves 106, 106*a*, 106*b*, 106*c*, and the ram will stop. Thus, it is possible for the operator to control the speed of both ascent and descent of the lifting beam 40 by controlling the speed of the engine and hence the volume of fluid delivered by pumps 102 and 102*a*.

The system as described above corresponds substantially to that described in my U.S. Pat. No. 3,703,243. The system of the present invention is different in that two pumps 102 and 102*a* (which may be a single pump with two sections) are utilized singly or together by use of two control valves 103, 103*a*, the control valves being actuated by single control 104 which applies the flow from pump 102 to the circuit upon initial movement of control 104. Further movement then applies the flow from the second pump 102*a*. Thus, a smaller engine for lifting and propulsion of the vehicle can be used while attaining a high hoisting speed. Since the maximum power demands for propulsion and hoisting do not coincide, this method of controlling the hoisting speed enables the use of a smaller power plant.

In order to insure that all rams will be displaced approximately equal amounts despite variations of load and internal leakage, it is necessary to further refine or trim the system. Therefore, means of sensing uneven extensions of the rams 108, 108*a*, 108*b*, 108*c* are provided. A system of cable pulleys, sensors and solenoid valves is used to accomplish this end, the system being similar to that described in U.S. Pat. No. 3,703,243.

The sensors 118, 118*a* and 118*b* are intended to sense changes in the tension of the cable 150 threaded through them and to translate the information into electrical signals. The sensors may be exactly the same as those described in the aforementioned patent at FIGS. 8, 9 and 10 although other sensors may also be employed.

FIG. 7 shows that at the base of each cylinder and communicating with the hydraulic fluid within same, there is mounted a respective solenoid controlled valve 116, 116*a*, 116*b*, 116*c* of the "normally closed" type. Fluid passing through the valves is returned to the tank 101 by line 119. This solenoid valve has one end of its coil attached to an electric power source 117 such as a storage battery, the other end of the coil being attached to a corresponding switch in sensor 118. It can be seen in FIG. 7 that switch 128 is connected to solenoid 116*c* and that the remaining switches are connected to their respective solenoids.

In FIG. 7, cable 150*c* is attached to ram 108*c* at point 151*c* and is threaded under sheave 153*c* and thence through sensor 118 and over sheave 206 to a weight 190. Cables 150*a* and 150*b* are attached to weight 190 through sensors 118*a* and 118*b* in a manner similar to that of cable 150*c* while cable 150 is connected directly to weight 190—that is, it does not pass through a sensor. This arrangement is different from that employed in my U.S. Pat. No. 3,703,243. The trimming device described in U.S. Pat. No. 3,703,243 will operate in chain fashion—that is, one correction follows another until all cylinders are evenly extended. The cable rigged as shown in FIG. 15 of the foregoing patent will also allow the cylinders to descend whenever the load is removed from the beam (as when the beam is rested on top of a container—thus allowing cable 50 of FIG. 15 to become slack).

In the present invention, lift cylinder 107 is directly connected to movable weight 190 which is elevated or lowered by the extension or retraction of ram 108. The other three cylinders' cables 150*a*, 150*b* and 150*c* are also attached to weight 190. The system functions as in U.S. Pat. No. 3,703,243 except that cylinder 107 is now the master and the others govern or are governed by it. The sheaves 54 and 55 in U.S. Pat. No. 3,703,243 are eliminated and the cylinders will not trim or otherwise react when the lifting cables are slack. The only malfunction which can destroy the system would be for weight 190 to seize in its track; otherwise, it acts as a safety device.

In the present invention, an additional circuit is included which is not present in my earlier U.S. Pat. No. 3,703,243. Frequently containers are loaded or unloaded from trailer chassis which are considerably higher at one end than the other. It is desirable to tilt lifting beam 40 to compensate for this condition. In the present invention, this is effected by enabling the operator to change the effective length of the cables in the trimming device. Although shown as a hydraulic system in FIG. 7, it could be operated with a lever connected to a swing arm and sheave or any method of varying the effective length of the trim cables. In this illustration a hydraulic control valve 200 in cab 37 controls the flow of fluid from a small engine driven pump 202 or other pressure source to a cylinder 204 on which are mounted sheaves 206 and 208 (not shown) for the cables to be controlled such as cables 150*b* and 150*c*. If the cable tension or length of these cables is adjusted with control cylinder 204 in an intermediate position, the operator may extend or retract the control cylinder and hence cause the trimming device to lower one or the other ends of lifting beam 40. The container may be engaged by the twist locks or lifted off those on the chassis without cocking or binding.

HYDRAULIC BEAM SHIFT

The beam is controlled as shown in FIG. 6 of U.S. Pat. No. 3,703,243 except that two fore and aft cylinders 46*a* connected in parallel are used instead of one.

What is claimed is:

1. A straddle carrier, either end of which may be driven over a load to be lifted, said straddle carrier comprising:

a chassis including spaced parallel elongated frame members connected together adjacent their respective ends by vertically disposed structural arches to form a rigid rectangular frame enclosing an unobstructed load bay;

at least two pairs of wheels disposed on each side of said chassis;

air over oil suspension means for attaching each said wheel to said chassis;

rectangular load lifting means disposed between said frame members;

means for attaching said load lifting means to a load;

means for raising and lowering the load lifting means including hydraulic cylinders connected at their lower ends to said frame members and disposed adjacent the corners of said rectangular load lifting means;

upwardly movable rams respectively disposed in said cylinders;

pulleys respectively mounted on the rams;

cables respectively connected to said four corners of said load lifting means and extending over said pulleys with their other ends connected to said chassis and a hydraulic circuit for simultaneously actuating said rams to raise or lower said load lifting means; and means for controlling the raising and lowering means for the load lifting means including means for sensing uneven extensions of the rams including further cables each having one end connected to a ram, one of said further cables being directly connected to a weight and the remaining further cables being connected through said sensing means to said weight, said sensing means being responsive to the tensions of said remaining further cables to equalize the extensions of said rams.

2. A carrier as in claim 1 including means for varying the tension in two of said further remaining cables associated with a predetermined end of said load lifting means so that said predetermined end may be tilted with respect to the other end.

3. A straddle carrier which may be driven over either end of a load to be lifted, said carrier comprising a chassis including spaced parallel elongated frame members connected together adjacent their respective ends by vertically disposed structural arches to form a rigid rectangular frame enclosing an unobstructed load bay;

wheels disposed on each side of said chassis; and rectangular load lifting means disposed between said frame members; means for attaching said load lifting means to a load; means for raising and lowering the load lifting means; means for guiding the load lifting means during ascent and descent including four closed tracks respectively disposed at the corners of said chassis;

two cross beams movably mounted (a) in the pairs of closed guide tracks at the respective ends of said chassis and (b) with respect to the respective ends of said rectangular load lifting means, said cross beams including compensating means for adjusting the length thereof so that the ends of said cross beams are retained in said closed guide tracks to compensate for deflections of the frame members which may cause the closed guide tracks to vary in alignment with respect to each other; and connecting means connected between said load lifting means and said cross beams and means for adjusting the length of said connecting means to thereby position said load lifting means from side to side between the frame members of said chassis or fore and aft.

4. A straddle carrier as in claim 3 including rollers mounted on each end of said two cross beams in said closed guide tracks so that each roller is normally retained by its associated closed track and where said compensating means includes means for telescopically mounting at least one of the rollers with respect to each of the cross beams.

5. A straddle carrier which may be driven over either end of a load to be lifted, said carrier comprising a chassis including spaced parallel elongated frame members connected together adjacent their respective ends by vertically disposed structural arches to form a rigid rectangular frame enclosing an unobstructed load bay;

wheels disposed on each side of said chassis;

rectangular load lifting means disposed between said frame members; means for attaching said load lifting means to a load; means for raising and lowering the load lifting means including hydraulic cylinders connected at their lower ends to said frame members and disposed adjacent the corners of said rectangular load lifting means; upwardly movable rams respectively disposed in said cylinders; pulleys respectively mounted on the rams; cables respectively connected to said four corners of said load lifting means and extending over said pulleys with their other ends connected to said chassis and a hydraulic circuit for simultaneously actuating said rams to raise or lower said load lifting means; and means for controlling the raising and lowering means for the load lifting means including means for sensing uneven extensions of the rams including further cables each having one end connected to a ram, one of said further cables being directly connected to a weight and the remaining further cables being connected through said sensing means to said weight, said sensing means being responsive to the tensions of said remaining further cables to equalize the extensions of said rams.

6. A carrier as in claim 5 including means for varying the tension in two of said further remaining cables associated with a predetermined end of said load lifting means so that said predetermined end may be tilted with respect to the other end.

7. A straddle carrier, either end of which may be driven over a load to be lifted, said straddle carrier comprising:

a chassis including spaced parallel elongated frame members connected together adjacent their respective ends by vertically disposed structural arches to form a rigid rectangular frame enclosing an unobstructed load bay;

at least two pairs of wheels disposed on each side of said chassis where the wheels of each pair are tandem mounted with respect to one another; and air over oil suspension means for attaching each said wheel to said chassis, said air over oil suspension means including a member disposed within the suspension means for decreasing the air space in the suspension means to thereby reduce the space into which the air inside the suspension means may be compressed to thus establish the rate of compression of the suspension means and hence enhance the stability of said carrier, said air over oil suspension means also including extension controlling means for controlling the rate of extension of said air over oil suspension means, said extension controlling means having a tubular member connected to said air space decreasing member and a piston and rod assembly mounted for reciprocating movement within said tubular member, said rate of extension being controlled at least by the size of the clearance between said piston and said tubular member, said clearance controlling the rate of flow of the fluid passing therethrough as said air over oil suspension means extends.

8. A straddle carrier as in claim 7 where said air over oil suspension means includes an annular cap disposed on the end of said tubular member through which the piston rod extends, said rate of extension being further controlled by the clearance between the opening in the cap and the piston rod.

9. A straddle carrier as in claim 8 where said piston rod is outward tapered where it connects to the piston to reduce fluid escape through the clearance between the opening in the cap and the piston rod as in the piston nears the cap.

10. A straddle carrier as in claim 8 where said end cap includes at least one opening therein and said air over oil suspension means includes an annular check valve disposed around said piston rod and adjacent said opening.

11. A straddle carrier as in claim 8 where said tubular member includes openings in the upper portion of the tubular member.

12. A straddle carrier, either end of which may be driven over a load to be lifted, said straddle carrier comprising:

a chassis including spaced parallel elongated frame members connected together adjacent their respective ends by vertically disposed structural arches to form a rigid rectangular frame enclosing an unobstructed load bay;

at least two pairs of wheels disposed on each side of said chassis where the wheels of each pair are tandem mounted with respect to one another; and air over oil suspension means for attaching each said wheel to said chassis, said air over oil suspension means including a plurality of hollow trunnion means respectively connected to said wheels; housing means in said frame members for respectively receiving said trunnion means; both said trunnion means and said housing means having compressed air over oil disposed therein, both said trunnion means and said housing means also having tubular portions, said tubular portions of said trunnion means being rotatively disposed with respect to said tubular portions of said housing means, said air over oil suspension means also including an air space decreasing member disposed within said housing means for decreasing the air space in said housing to thereby reduce the space into which the air inside the suspension means may be compressed to thus establish the rate of compression of the suspension means and hence enhance the stability of said carrier, said air space decreasing member occupying a substantial portion of the interior space of said housing means, said air over oil suspension means further including an extension controlling means for controlling the rate of extension of said air over oil suspension means, said extension controlling means having a tubular member connected to said air space decreasing member and a piston and rod assembly mounted with respect to said trunnion means for reciprocating movement within said tubular member, said rate of extension being controlled at least by the size of the clearance between said piston and said tubular member, said clearance controlling the rate of flow of the fluid passing therethrough as said air over oil suspension means extends.

13. A straddle carrier as in claim 12 where said air over oil suspension means includes an annular cap disposed on the end of said tubular member through which the piston rod extends, said rate of extension being further controlled by the clearance between the opening in the cap and the piston rod.

14. A straddle carrier as in claim 12 where said piston rod is outward tapered where it connects to the piston to reduce fluid escape through the clearance between the opening in the cap and the piston rod as the piston nears the cap.

15. A straddle carrier as in claim 13 where said end cap includes at least one opening therein and said air over oil suspension means includes an annular check valve disposed around said piston rod and adjacent said opening.

16. A straddle carrier as in claim 15, including means for maintaining said annular check valve near the bottom of said tubular member.

17. A straddle carrier as in claim 13 where said tubular member includes openings in the upper portion of the tubular member.

18. A straddle carrier, either end of which may be driven over a load to be lifted, said straddle carrier comprising:

(a) a chassis means for carrying the lifted load, said chassis means including a pair of spaced parallel elongated frame members connected together at respective ends by a pair of vertically disposed structural arches which define an unobstructed load bay, each of said vertically disposed structural arches including a pair of vertical legs and each vertical leg in said pair of vertical legs having a closed vertical track attached thereto;

(b) two pair of wheels disposed on each side of said chassis means, one wheel in each said pair being arranged in tandem with respect to the remaining wheel in each said pair; and (c) a plurality of suspension means for respectively attaching each of said plurality of wheels to said chassis means, each said suspension means including a housing structure secured to said chassis means, a tube structure secured within said housing structure, a trunnion means supported within said housing structure for movement between a fully extended position and a fully retracted position with respect to said housing structure, said trunnion means having an end portion attached to one of said plurality of wheels, and a piston means secured to said trunnion means and slidably mounted within said tube structure for controlling the amount of movement of said trunnion means with respect to said housing structure; and (d) motor means secured to said chassis means for driving at least one of said wheels on each side of said chassis means.

19. A straddle carrier as set forth in claim 18, wherein said tube structure has at least one radial opening formed therein to provide for fluid communication between said tube structure and said housing structure, said radial opening being positioned relative to said piston means such that when said tube structure is filled with fluid said radial opening causes the rate of extension of said trunnion means to decrease as said trunnion approaches said lower limit of movement.

20. A straddle carrier, either end of which may be driven over a load to be lifted, said straddle carrier comprising:

(a) a chassis means for carrying the lifted load, said chassis means including a plurality of vertical legs which together define an unobstructed load bay, each of said vertical legs having a closed vertical track attached thereto;

(b) a plurality of wheels secured to said chassis means; and (c) load lifting means for lifting the load up into said unobstructed load bay and for supporting the load during lifting, said load lifting means including a lifting beam structure having a plurality of cross beam end means projecting therefrom and respectively mounted for movement within each of said closed vertical tracks, said lifting beam structure also having a compensating means for adjusting the extension of said cross beam end means such that said cross beam end means remain movably mounted within said plurality of closed vertical tracks in response to deflections in said plurality of vertical legs, which deflections cause said plurality of closed vertical tracks to vary in alignment with respect to one another.

21. A straddle carrier, either end of which may be driven over the end of a load to be lifted, said straddle carrier comprising:

(a) a chassis means for carrying the lifted load, said chassis means including a frame structure which defines an unobstructed load bay;

(b) a plurality of wheels secured to said chassis means;

(c) lifting beam means for supporting the load within said ubobstructed load bay during lifting;

(d) extension means for raising and lowering said lifting beam means, said extension means including a plurality of extendible structures having lower ends respectively connected to said chassis means and upper ends respectively interconnected with said lifting beam means for extension and retraction relative to said chassis means;

(e) lift control means for extending or retracting said upper ends of said plurality of extendible structures to control the raising and lowering of said lifting beam means; and (f) trim means for adjusting said lift control means to equalize the extensions or retractions of said upper ends of said plurality of extendible structures, said trim means including a sensing means for sensing uneven extensions or retractions of said upper ends relative to one another, said trim means further including a weight and a plurality of sensing cables respectively connected between said upper ends and said weight, one of said sensing cables being directly connected to said weight and the remaining sensing cables being connected through said sensing means to said weight such that said sensing means is responsive to the tensions in said remaining sensing cables.

22. A straddle carrier, either end of which may be driven over the end of a load to be lifted, said straddle carrier comprising:

(a) a chassis means for carrying the lifted load, said chassis means including a frame structure which defines an unobstructed load bay;

(b) a plurality of wheels secured to said chassis means;

(c) lifting beam means for supporting the load within said unobstructed load bay during lifting;

(d) hydraulic extension means for raising and lowering said lifting beam means, said hydraulic extension means including a plurality of hydraulic cylinders having lower ends respectively connected to said chassis means, said hydraulic extension means also including a plurality of movable ram means respectively disposed within said plurality of hydraulic cylinders for extension and retraction relative to said chassis means, a plurality of pulleys respectively mounted on said plurality of movable ram means, and a plurality of cables respectively extending over said plurality of pulleys, each of said plurality of cables having one end thereof connected to said lifting beam means and the other end thereof connected to said frame structure;

(e) hydraulic lift control circuit means for extending or retracting said plurality of movable ram means to control the raising and lowering of said lifting beam means; and (f) trim means for adjusting said hydraulic lift control circuit means to equalize the extensions or retractions of said plurality of movable ram means, said trim means including a sensing means for sensing uneven extensions or retractions of said plurality of movable ram means relative to one another, said trim means further including a weight and a plurality of sensing cables respectively connected between said plurality of movable ram means and said weight, one of said sensing cables being directly connected to said weight and the remaining sensing cables being connected through said sensing means to said weight such that said sensing means is responsive to the tensions in said remaining sensing cables.

23. A straddle carrier, either end of which may be driven over the end of a load to be lifted, said straddle carrier comprising:

(a) a chassis means for carrying the lifted load, said chassis means including a frame structure which defines an unobstructed load bay;

(b) a plurality of wheels secured to said chassis means;

(c) lifting beam means for supporting the load within said unobstructed load bay during lifting;

(d) extension means for raising and lowering said lifting beam means, said extension means including a plurality of extendible structures having lower ends respectively connected to said chassis means and upper ends respectively interconnected with said lifting beam means for extension and retraction relative to said chassis means;

(e) lift control means for extending or retracting said upper ends of said plurality of extendible structures to control the raising and lowering of said lifting beam means;

(f) trim means for adjusting said lift control means to equalize the extensions or retractions of said upper ends of said plurality of extendible structures, said trim means including a sensing means for sensing uneven extensions or retractions of said upper ends relative to one another; and (g) tilt means for adjusting said trim means to tilt one end of said lifting beam means relative to the other end of said lifting beam means.

24. A frame and suspension system for a straddle carrier, said frame and suspension system comprising:

(a) a chassis means for carrying a lifted load, said chassis means including a pair of spaced parallel elongated frame members connected together at respective ends by a pair of vertically disposed structural arches which define an unobstructed load bay, each of said vertically disposed structural arches including a pair of vertical legs and each vertical leg in said pair of vertical legs having a closed vertical track attached thereto;

(b) two pairs of wheels disposed on each side of said chassis means, one wheel in each said pair being arranged in tandem with respect to the remaining wheel in each said pair;

(c) a plurality of suspension means for respectively attaching each of said wheels to said chassis means, each said suspension means including a housing structure secured to one of said frame members, a tube structure secured within said housing structure, a trunnion means supported within said housing structure for movement between a fully extended position and a fully retracted position with respect to said housing structure, said trunnion means having an end portion attached to one of said wheels, and a piston means secured to said trunnion means and slidably mounted within said tube structure for controlling the amount of movement of said trunnion means with respect to said housing structure; and (d) motor means secured to said chassis means for driving at least one of said wheels on each side of said chassis means.

25. A straddle carrier, either end of which may be driven over a load to be lifted, said straddle carrier comprising:

(a) a chassis means for carrying the lifted load, said chassis means including a pair of spaced parallel elongated frame members connected together at respective ends by a pair of vertically disposed structural arches which define an unobstructed load bay, each of said vertically disposed structural arches including a pair of vertical legs and each vertical leg in said pair of vertical legs having a closed vertical track attached thereto;

(b) two pairs of wheels disposed on each side of said chassis means, one wheel in each said pair being arranged in tandem with respect to the remaining wheel in each said pair;

(c) a plurality of suspension means for respectively attaching each of said wheels to said chassis means, each said suspension means including a housing structure secured to one of said frame members, a tube structure secured within said housing structure, a trunnion means supported within said housing structure for movement between a fully extended position and a fully retracted position with respect to said housing structure, said trunnion means having an end portion attached to one of said wheels, and a piston means secured to said trunnion means and slidably mounted within said tube structure for controlling the amount of movement of said trunnion means with respect to said housing structure;

(d) motor means secured to said chassis means for driving at least one of said wheels on each side of said chassis means;

(e) lifting beam means for supporting the load within said unobstructed load bay during lifting, said lifting beam means including a lifting beam structure having a plurality of cross beam end means projecting therefrom and respectively mounted for movement within each of said closed vertical tracks, said lifting beam structure also having a compensating means for adjusting the extension of said cross beam end means such that said cross beam end means remain movably mounted within said plurality of closed vertical tracks in response to deflections in said vertical legs, which deflections cause said plurality of closed vertical tracks to vary in alignment with respect to one another.

(f) hydraulic extension means for raising and lowering said lifting beam structure, said hydraulic extension means including a plurality of hydraulic cylinders having lower ends respectively connected to said chassis means and upper ends respectively connected to said lifting beam structure, said hydraulic extension means also including a plurality of movable ram means respectively disposed within said plurality of hydraulic cylinders for extension and retraction relative to said chassis means, a plurality of pulleys respectively mounted on said plurality of movable ram means, and a plurality of cables respectively extending over said plurality of pulleys, each of said plurality of cables having one end thereof connected to said lifting beam structure and the other end thereof connected to said frame structure;

(g) hydraulic lift control circuit means for extending or retracting said plurality of movable ram means to control the raising and lowering of said lifting beam structure; and (h) trim means for adjusting said hydraulic lift control circuit means to equalize the extensions or retractions of said plurality of movable ram means, said trim means including a sensing means for sensing uneven extensions or retractions of said plurality of movable ram means relative to one another, said trim means further including a weight and a plurality of sensing cables respectively connected between said plurality of movable ram means and said weight, one of said sensing cables being directly connected to said weight and the remaining sensing cables being connected through said sensing means to said weight such that said sensing means is responsive to the tensions in said remaining sensing cables.

26. A straddle carrier as set forth in claims 18 or 24, wherein said dispersion means is an air over oil system and further including a plurality of equalizing means for equalizing the air pressure in adjacent suspension means, each said equalizing means having a tube means to provide for air flow between the housing structures of adjacent suspension means.

27. A straddle carrier as set forth in claim 20, wherein said lifting beam structure also has both a lifting frame structure movably supported by said plurality of cross beam end means and an adjusting means interconnected between said lifting frame structure and said plurality of cross beam end means for positioning said lifting frame structure side to said, fore and aft, or in a slewed orientation relative to said vertical legs of said chassis means.

28. A straddle carrier as set forth in claims 18, or 24, including steering means for simultaneously actuating said plurality of wheels to cause wheels disposed at opposite ends of said chassis means to turn through opposite angles of rotation such that the projections of the axes of rotation of all said wheels intersect at a common point for all radii of curvature of steering.

29. A straddle carrier as set forth in claims 22 or 25, wherein said hydraulic lift control circuit means includes a tank, first and second pump means for supplying hydraulic fluid to said hydraulic lift control circuit means, first and second valves respectively connected to said first and second pump means, and a single valve control means for actuating said first and second valves such that said first valve applies hydraulic fluid from said first pump means to said hydraulic lift control circuit means upon initial movement of said single valve control means and said second valve applies hydraulic fluid from said second pump means to said hydraulic lift control circuit means upon further movement of said single valve control means.

* * * * *